United States Patent [19]

Smith

[11] 4,326,406

[45] Apr. 27, 1982

[54] PRESSURE TESTER FOR PIPES

[76] Inventor: Eugene D. Smith, 3100 Hollins, Bakersfield, Calif. 93305

[21] Appl. No.: 131,943

[22] Filed: Mar. 21, 1980

[51] Int. Cl.³ .............................................. G01M 3/28
[52] U.S. Cl. ....................................................... 73/49.1
[58] Field of Search .................................. 73/49.1, 49.5

[56] References Cited

U.S. PATENT DOCUMENTS

| | | | |
|---|---|---|---|
| 3,095,729 | 7/1963 | McConnell | 73/49.1 |
| 3,179,127 | 4/1965 | Terry | 73/49.1 X |
| 3,460,376 | 8/1969 | Kemp | 73/49.1 X |
| 3,710,628 | 1/1973 | Horton | 73/49.5 |
| 3,877,293 | 4/1975 | McKeage | 73/49.1 |
| 4,182,160 | 1/1980 | Powers et al. | 73/49.5 |
| 4,192,177 | 3/1980 | Crickard et al. | 73/49.1 X |

FOREIGN PATENT DOCUMENTS 2158735  6/1972  Fed. Rep. of Germany ....... 73/49.1

*Primary Examiner*—Charles A. Ruehl
*Assistant Examiner*—Joseph W. Roskos
*Attorney, Agent, or Firm*—Donald D. Mon

[57] ABSTRACT

A pressure tester for pipes including a frame supporting a pair of threaded pipe attachments which can be threaded to the threaded ends of a pipe and are provided with means for injecting liquid under pressure to ascertain the integrity of the pipe under pressure. One of the pipe attachments is axially and pivotally movable relative to the frame and another is vertically and pivotally movable relative to the frame. A tilt elevator can raise one end to tilt the pipe during the filling operation. A vent valve is provided to exhaust air from the pipe so that it can be completely filled with water. Other pipe handling components are also described.

18 Claims, 3 Drawing Figures

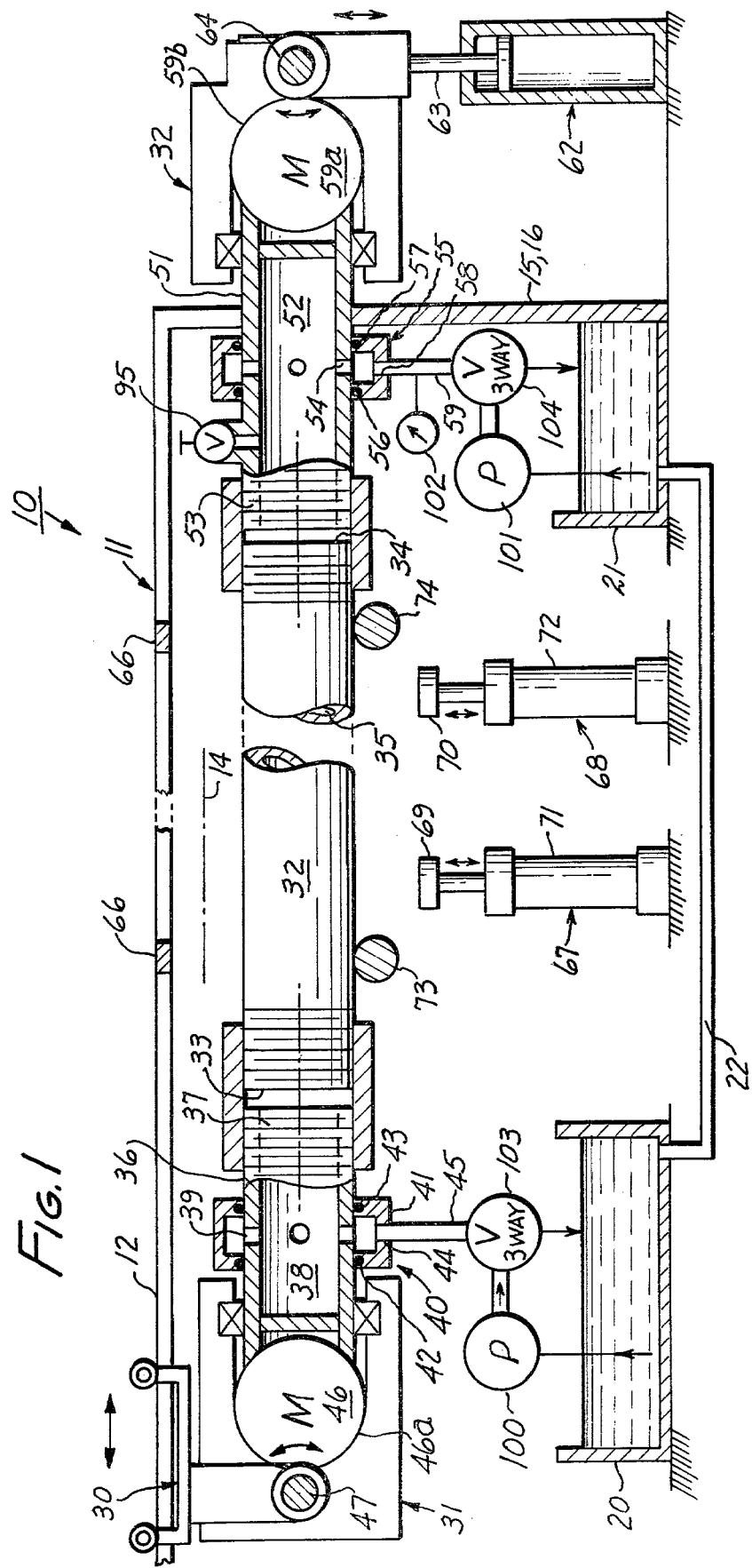

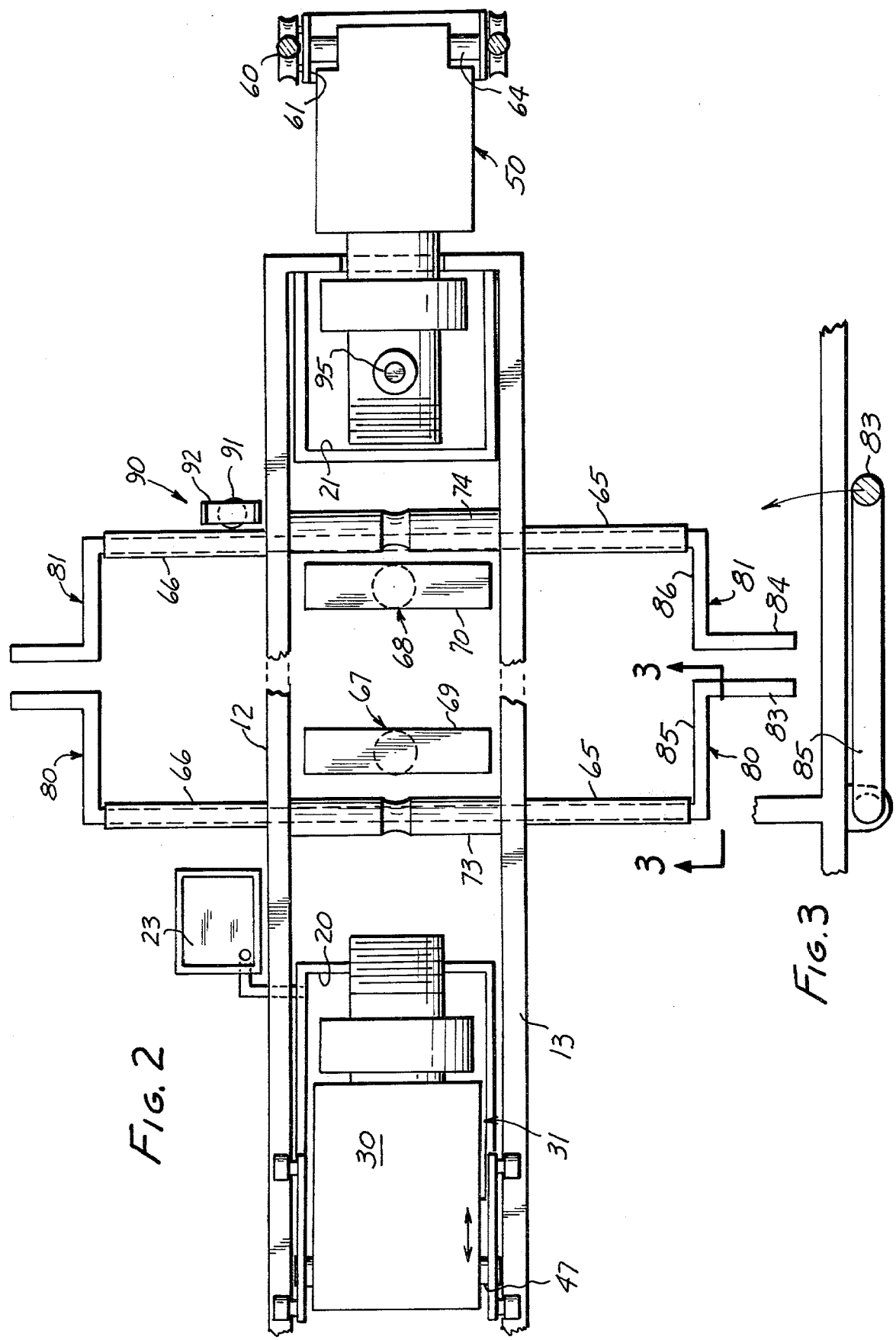

PRESSURE TESTER FOR PIPES

FIELD OF THE INVENTION

This invention relates to the testing of pipe for integrity under pressure.

BACKGROUND OF THE INVENTION

Pipe intended to carry fluids under substantial pressure, especially oil well pipe and tubing, needs periodically to be tested to determine its integrity. The conventional way of accomplishing this is to fill the pipe with water under pressure and observe its ability to retain the pressure for a period of time. An example of one such device is shown in Horton U.S. Pat. No. 3,710,628, issued Jan. 16, 1973.

Pipes must be tested in relatively large quantities, and especially oil field pipe and tubing are heavy, bulky, and clumsy to handle. The inspection technique is apt to be labor-intensive, and it is therefore important to provide a tester which obtains maximum productivity from the crew no matter how many men are required to operate the device. It is an object of this invention to provide a pressure tester which can accurately and reliably test a pipe for integrity under pressure, which minimizes the physical exertion of the men who operate it, and maximizes their output.

BRIEF DESCRIPTION OF THE INVENTION

A pipe tester according to this invention includes a frame to which there is mounted a pair of pipe attachment means which include rotatably threaded plugs adapted to engage threads on the ends of the pipe to be tested, and which have passages which communicate with the passage inside the pipe when they are attached. Means is provided for turning these plugs around their own axes. Both of the plugs are pivotal in a vertical plane. One of the plugs is axially movable relative to the pipe and one of the plugs is vertically movable relative to the pipe, whereby the pipe attachment means can be brought toward the pipe to be threaded to it, and one end of the pipe can be raised for purposes of expeditiously filling the pipe. A vent valve is provided to vent air from the pipe while it is being filled, and at least one swivel connection is provided for filling the pipe with liquid.

According to a preferred but optional feature of the invention, a pair of tanks are provided to carry water to be forced into the pipe and into which the water can drain when the pipe is emptied.

According to a preferred but optional feature of the invention, lateral loading rails are provided to roll the pipe to an operative position, and a pipe elevator is provided to lower the pipe to a position where it will be engaged by the pipe attachment means.

According to a preferred but optional feature of the invention, a pipe lift is provided for lifting pipe to the elevation of the loading rails.

The above and other features of this invention will be fully understood from the following detailed description and the accompanying drawings, in which:

BRIEF DESCRIPTION OF THE DRAWINGS

FIG. 1 is a side elevation partly in cut away cross section taken at line 1—1 in FIG. 2;

FIG. 2 is a plan view of the invention; and

FIG. 3 is a fragmentary view of a portion of the invention taken at line 3—3 in FIG. 2.

DETAILED DESCRIPTION OF THE DRAWINGS

The presently preferred embodiment of pipe tester 10 according to the invention is shown in FIGS. 1-3. It includes a frame 11, preferably made of welded or bolted-together steel structural members, which includes a pair of top rail members 12, 13 extending along a frame axis 14. Uprights and cross members, for example upright 15 and cross member 16 will be provided as necessary for the integrity of the apparatus. If desired, the frame can be skid-mounted or wheel-mounted, as preferred. An advantage of this construction is that it can be wheel mounted and moved around as a trailer.

Toward the bottom of the frame are a first tank 20 and a second tank 21, connected by balance line 22 to keep water in both tanks. These tanks serve as catch basins and as reservoirs for the water or whatever other liquid might be used in the pressure testing. Also, a drain basin 23 is provided at one side of the frame connected by hose 24 to tank 20 for a purpose yet to be described.

A carriage 30 utilizes the left hand portion of top rail members 12 and 13 as a track to support it for axial reciprocation in the frame. This carriage supports a first pipe attachment means 31 which is trunnion-mounted so that it can rotate in a vertical plane. Because the carriage is axially slidable, pipe attachment means 31 is therefore vertically pivotal and axially movable relative to the axis of the frame.

First pipe attachment means 31 is intended to be threaded to the ends of a pipe 32 which has a first end 33 and a second end 34 both of which ends are threaded. There is a conventional pipe passage 35 from end to end of the pipe.

First pipe attachment means 31 includes a first plug 36 with an external thread 37 adapted to be threaded to the thread of the first end of the pipe. The first plug has a plug passage 38 opening onto its end so as to communicate with the passage in the pipe when they are joined. It is closed at its end farthest from the pipe, and has a plurality of side ports 39 which open into a hydraulic swivel joint 40. Swivel joint 40 includes a sleeve 41 sealed by peripheral seals 42, 43 to the plug, and passes a hose fitting 44 connected to a hose 45 for the introduction of liquid from tank 20 through a system yet to be described.

A bi-directional motor 46 rotates the plug to thread and unthread it. If preferred a hand wheel or other manual means could be provided instead of this motor. The motor may conveniently be a hydraulic motor or electric motor as preferred. Because there are so many hydraulic devices on this tester, a hydraulic motor will ordinarily be used. The pipe attachment means is mounted by bearing 47 which acts as a trunnion to the carriage. Of course a case or other structure will be provided to support the motor. The schematic illustration is adequate for purposes of this disclosure.

Second pipe attachment means 50 is provided at the other end of the frame. It has a rotatable second plug 51 with passage 52 and an external thread 53. Its passage is plugged at its end farthest from the threaded end, and its passage includes side ports 54 which lead to a hydraulic swivel 55 that carries seals 56, 57 and a hose fitting 58 for connection of a hose 59 for providing liquid for testing purposes. It also includes a motor 59a in a case 59b, the second plug being bearing mounted to the case for rotation around its own plug axis by the bi-directionally operable motor as in the first pipe attachment means.

Second pipe attachment means 50 (see FIG. 2) is mounted to the frame by means of a vertical rail 60 and a carriage 61 riding this rail. A tilt elevator 62 comprises a piston cylinder assembly 63 which can raise or lower the second pipe attachment means by raising or lowering carriage 61. Appropriate hydraulic connections and controls will be provided for this purpose. Second pipe attachment means 50 is connected to carriage 61 by bearings 64. The second pipe attachment means is therefore movable up and down in a vertical plane and rotatable (tiltable) therein, and its plug is rotatable around its own axis. Changes in horizontal dimension caused by changing the end elevation are accommodated by sliding of the first carriage.

The lower position is shown in FIG. 1. A tilted pipe position will be caused by extending the tilt elevator and raising the right hand end of the pipe in FIG. 1.

Loading rails 65 and unloading rails 66 are provided at the lateral sides of the frame at the elevation of the top rail members. They do not extend between the top rail members. Between them there are provided two pipe elevators 67, 68 which comprise rail sections 69, 70 which extend between the top rail members and can be raised or lowered relative to them. A pair of piston-cylinder assemblies 71, 72 are provided for this purpose so that a pipe which is rolled onto the elevator from the loading rail can be lowered to an operating position, tested, then raised to unloading position, and run off the other side loading rails. For support during part of the testing operation there are provided a pair of pipe rests 73, 74 to support the pipe at its lowermost desired position.

Pipe lifts in pairs 80, 81 are provided at each side of the apparatus. These are shown on only one side in FIG. 2. They constitute lever-type devices with arms 83, 84 onto which workmen can roll the pipe. Then the lifts are rotated around arms 85, 86 to raise their elevation to that of the loading rails, or to lower them from that elevation.

A drain elevator 90 has a piston-cylinder assembly 91 which is vertically movable and carries a saddle 92 to raise one end of the pipe after it is rolled onto unloading rail 66 so as to drain water from the pipe into the drain basin. The drain elevator will then lower the pipe and the pipe can be rolled off.

A vent valve 95 is mounted to the plug of the second pipe attachment means, and rotates with it. It is manually operated and is in communication with the passage 52. When it is open it can discharge fluid from the valve and when closed it will hold the system closed. This vent valve will rotate with the second pipe attachment means and the machine operator will simply "jockey" the motor on one of the pipe attachment means to bring the valve to a vertical position at the time that the testing procedure is to begin.

Appropriate hydraulic pressure and drain lines will be provided to both of the motors, and to the various pistons and piston cylinder assemblies in accordance with known hydraulic techniques which require no discussion here. These can be automated but usually will not be. A valve for each function is customarily provided for the operator. Of interest to this invention is the preferred means for supplying water to the pipe and then applying pressure under testing. This device enables the pipe to be filled when the tilt elevator has raised the second pipe attachment means so that the pipe is tilted. Then the purging of air and filling with water is facilitated. Water will be injected to the first pipe attachment so it rises smoothly in the pipe while purging air out of it through the vent valve which is kept open for this purpose. As soon as the operator detects that air is no longer coming from the vent valve he will close the valve, because the pipe will be full of water. Then water under pressure is injected through the second pipe attachments means to put the system under pressure. It will be understood of course that the entire operation could be conducted from only one end, but operations from both ends have proved to be speedier and easier for the crew.

With the foregoing construction in mind the operation of this device will now be described. When the device is ready for operation, ranks of pipe will be stacked next to the loading side of the device which is the lower side in FIG. 2. The men move pipe onto arms 83, 84 of pipe lifts 80, 81 and arms 85 and 86 are rotated to raise the pipe to the level of loading rails 65. One pipe at a time is next rolled cross the loading rails while the pipe elevators are in their upper position so that the pipe rolls smoothly onto them. The pipe elevators then lower, and this lowers the pipe until it reaches the pipe rest 73, 74. This stops the pipe and the elevator recedes further to provide clearance for the pipe.

Next, an operator takes hold of the first carriage and moves it against the first end of the pipe and pushes on it so the pipe is pressed against the second pipe attachment means, also. These movements are not difficult, because friction loads are relatively small. The motors of both pipe attachment means are operating in a threaded direction, and both ends will join to form a joint. The operator will know from the load on the machinery when the pipe threads are fully joined. The motors will then be stopped.

The tilt elevator will next be raised to elevate the second pipe attachment means and tilt the pipe downwardly toward the first pipe attachment means. At this time the vent valve will be open, and the operator will have turned the pipe so that the valve is in an upright position. Now a pump 100 is actuated and 3-way valve 100a will be set to inject water from the first tank into the pipe and the operator will wait to detect the presence of water at the valve, at which time he will close it. Pump 100 will then be stopped and valve 103a will be closed to exit of water from the pipe as preferred. If the pump 103 acts continuously valve 103a can merely by-pass its output to tank 20.

Pump 101 will then be turned on so as to place the inside of the pipe under pressure which is read by gauge 102. 3 way valve 104 can be set to enable this pressurizing, closed to hold it, and set to vent the pipe, as desired. It can by-pass the output of pump 101 to tank 21 if desired.

After the pipe has been tested, the tilt elevator is lowered and the motors are reversed so as to unthread the plugs from the pipe. A chain wrench can be wrapped around the pipe to restrain it from rotation during this unthreading operation if desired or necessary. Most of the water in the pipe will drain into the tanks at this time because the ends of the pipe are over them. However, it may not drain completely in a reasonable period of time. For this reason a drain elevator 90 is provided. To move the pipe to it, the pipe elevators are extended to raise the pipe to the level of the top rail members and the men roll the pipe onto unloading rail 66. The pipe is stopped for a moment, and the drain elevator tilts the pipe. The first end of the pipe is at that time over the drain basin, and catches the remaining water in the pipe which quickly flows into it. Then the drain elevator is lowered and the pipe is rolled to the pipe lift on the unloading side which lowers it to the ground to a rack.

The various hydraulic connections are not described in detail, because they are completely conventional. Persons skilled in the hydraulics art will readily recognize what they should be. The device as shown includes convenient means for loading and unloading pipe, for handling it in the tester, and for testing and draining the pipe. Although this device can be automated and provided with various interactive controls, it is so simple and easy to use that it can operate with the number of men ordinarily required simply to handle the pipe efficiently around it in the first place. In fact it appears that one can even afford to use extra men with this device because of the speed and efficiency of its operation.

This invention is not to be limited by the embodiment shown in the drawings and described in the description which is given by way of example and not of limitation, but only in accordance with the scope of the appended claims.

I claim:

1. Apparatus for testing the ability of a length of pipe to withstand internal pressure, said pipe having a pipe axis, a first end, a second end, a thread at each end, and a pipe passage extending from end to end, said apparatus comprising:

a frame having a longitudinal frame axis, and including a rail member extending axially along at least a portion of the axial length of the frame;

a carriage axially slidable on said rail member;

first pipe engagement means mounted to said carriage, said first pipe engagement means comprising a first threaded plug having a plug axis and threadable to said first end of said pipe, first bearing means supporting said plug for threading and unthreading rotations around its said plug axis, means for rotating said first plug bi-directionally, trunnion means mounting said first bearing means to said carriage for rotation in a vertical plane, whereby said first plug is axially movable along said frame axis, and rotatable in said vertical plane, and rotatable around its own axis, said first plug having a first plug passage which communicates with said pipe passage when they are threaded together;

first liquid supply means connected to said first plug passage for supplying liquid thereto;

a tilt elevator mounted to said frame and having an elevator portion movable up and down in a vertical plane;

second pipe engagement means mounted to said elevator portion, said second pipe engagement means comprising a second threaded plug having a plug axis and threadable to said first end of said pipe, second bearing means supporting said plug for threading and unthreading rotation around its said plug axis, means for rotating said second plug bi-directionally, trunnion means mounting said second bearing means to said elevator portion for rotation in said vertical plane, whereby said second plug is movable up and down and rotatable in said vertical plane, and rotatable around its own axis, said second plug having a second plug passage which communicates with said pipe passage when they are threaded together;

second liquid supply means connected to said second plug passage for supplying liquid thereto;

an on-off vent valve communicating with said passage in said second plug;

gauge means communicating with one of said passages to measure the pressure therein; and control means for controlling operation of said first and second liquid supply means.

2. Apparatus according to claim 1 in which pipe elevator means is disposed between said first and second pipe engagement means to raise and lower a length of pipe in a vertical plane.

3. Apparatus according to claim 2 in which said means for rotating the plugs around their axes are bi-directional motors.

4. Apparatus according to claim 2 in which loading and unloading rails extend laterally from said frame, and are on the opposite sides of the pipe engagement means from one another at an upper elevation, said pipe elevator spanning the space between them when at that elevation, and receding to carry said pipe to a lower elevation where said pipe engagement means are disposed.

5. Apparatus according to claim 4 in which a pipe rest is disposed at said lower elevation to support the pipe at that elevation.

6. Apparatus according to claim 4 in which pipe lift means is provided at each side of the apparatus, adjacent to said loading and unloading rails to lift and lower pipe thereto.

7. Apparatus according to claim 1 in which said means for rotating the plugs around their axes are bi-directional motors.

8. Apparatus according to claim 1 in which said control means comprises a valve for each of said pipe engagement means to permit introduction of liquid and selectively to prevent its exhaust.

9. Apparatus according to claim 8 in which means for rotating the plugs around their axes are bi-directional motors.

10. Apparatus according to claim 1 in which said vent valve is manually operable.

11. Apparatus according to claim 10 in which said means for rotating the plugs around their axes are bi-directional motors.

12. Apparatus according to claim 1 in which a tank is placed under each of said plugs to act as a liquid reservoir and as a drain basin.

13. Apparatus according to claim 12 in which said means for rotating the plugs around their axes are bi-directional motors.

14. Apparatus according to claim 1 in which a drain basin is disposed adjacent to said rail member and in which a drain elevator is adapted to raise the pipe at a distance therefrom to tilt the pipe to drain into said drain basin.

15. Apparatus according to claim 14 in which pipe elevator means is disposed between said first and second pipe engagement means to raise and lower a length of pipe in a vertical plane.

16. Apparatus according to claim 1 in which control means is provided to control the operation of said means to rotate said plugs around their axes.

17. Apparatus according to claim 16 in which said last named means are bi-directional motors.

18. Apparatus according to claim 1 in which said liquid supply means are hydraulic swivel joints.

* * * * *